U. D. TAYLOR.
Lamp.
No. 42,028.  Patented March 22, 1864.
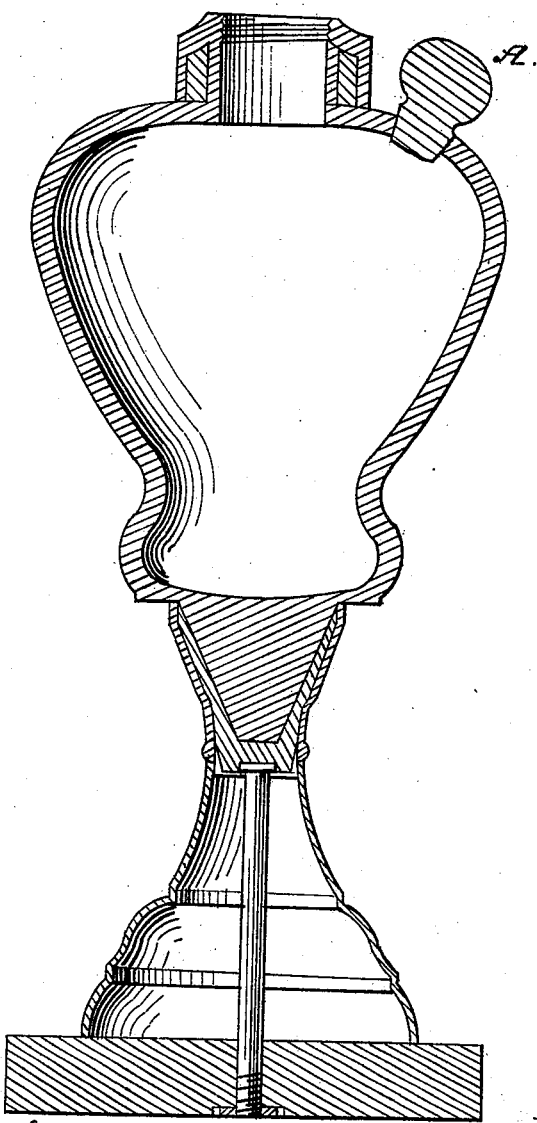

UNITED STATES PATENT OFFICE.

U. D. TAYLOR, OF FORT MADISON, IOWA.

IMPROVEMENT IN COAL-OIL LAMPS.

Specification forming part of Letters Patent No. 42,028, dated March 22, 1864.

*To all whom it may concern:*

Be it known that I, U. D. TAYLOR, of Fort Madison, in the State of Iowa, have invented certain new and useful Improvements in the Construction of Stopples for Glass Oil-Lamps; and I hereby declare that the following is a true and exact description of the same, reference being had to the accompanying drawing, and to the letters of reference marked thereon.

The nature of my invention consists in the use of a ground-glass stopple fitting in the hole made for the introduction of oil in the lamp.

The figure, marked 1 in the annexed drawing, represents a vertical section of the lamp.

The letter A represents the glass stopple, which is to be ground into the circular opening, made near the neck of the lamp for the admission of oil. The object of the stopple thus prepared and used is to prevent the escape of the volatile parts of the oil which are evolved from the heated contents of the lamp. I am aware that various modes have been resorted to in order to effect this object. Among these stopples of cork have been used, and also metallic caps fitted on a flat metallic ring, the ring being cemented to a neck or a small elevation around the outer circumference of the hole. But all these devices have proved ineffectual, and something more was needed to confine and prevent the escape of this subtile and penetrating agent, which doubtless consists of carbonated hydrogen gas' rendered offensive by bearing off with it the volatile and fetid constituent of the oil. It will be remarked that the escape of this gas occurs only at the moment the lamp is extinguished. While the lamp is burning it is carried off with the current of oil necessary to support combustion and is there consumed. But when the flame of the lamp is extinguished and the upward flow of the oil arrested, the gas, having no avenue of escape, a portion of it will be absorbed by the oil in the wick, and the remainder, contained in the body of the lamp, will seek a vent in another direction, the means hitherto employed having proved insufficient to prevent its escape. That the glass stopple will successfully meet the case is a fact fully established by the use of it in confining ether—the most volatile of all liquids.

Having thus described my invention, what I claim, and desire to secure by Letters Patent, is—

The use of a glass ground stopple, A, in connection with a glass lamp, as and for the purpose substantially as herein set forth.

In testimony that I claim the foregoing I hereby affix my signature in the presence of two witnesses.

U. D TAYLOR.

Witnesses:
   H. S. EATON,
   A. N. EATON.